July 24, 1956 — B. L. KNAPP — 2,756,059
ADJUSTABLE WORK STOP FOR LATHE SPINDLES
Filed Dec. 14, 1953
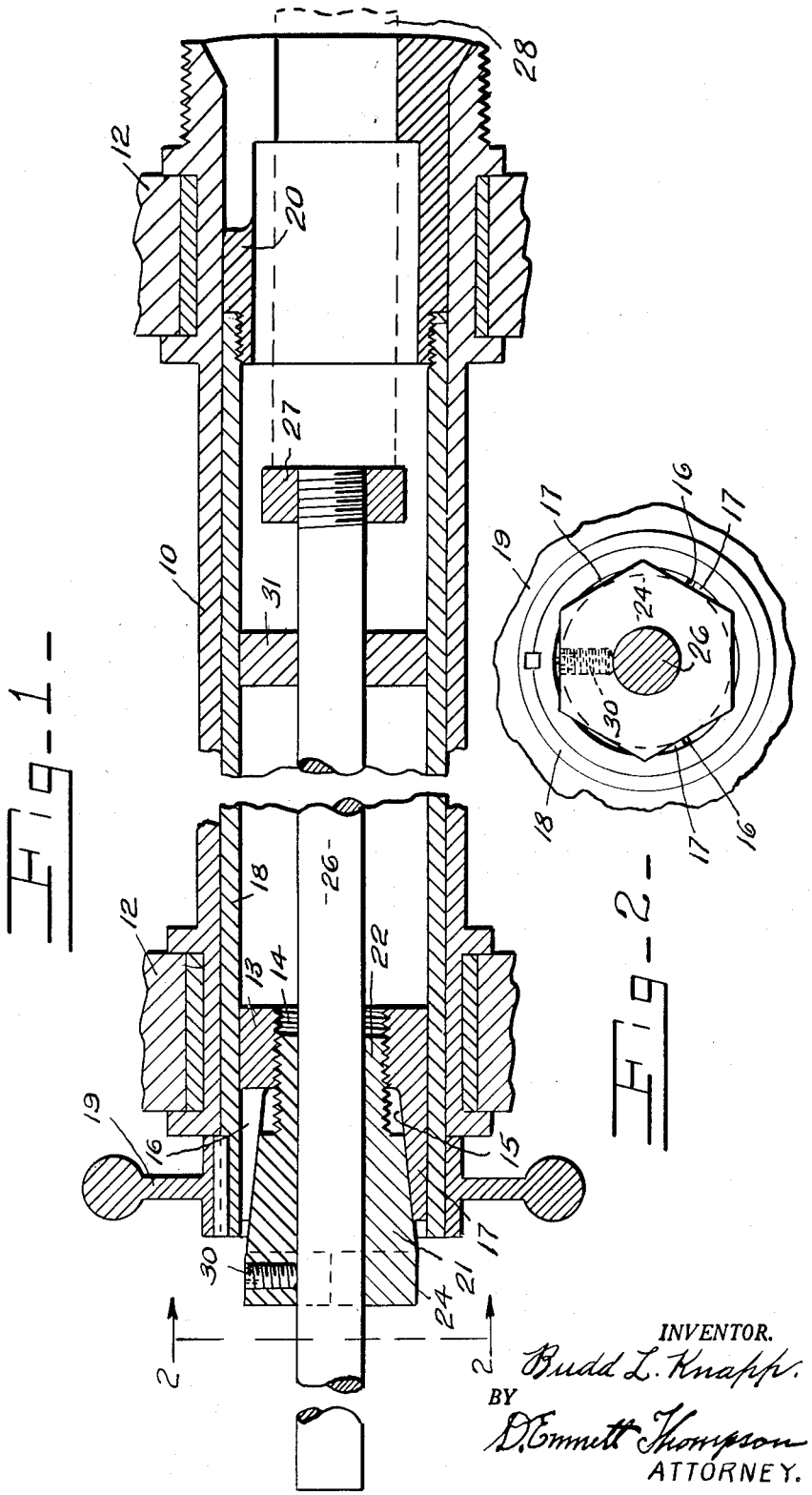
INVENTOR.
Budd L. Knapp.
BY
D. Emmett Thompson
ATTORNEY.

United States Patent Office 2,756,059
Patented July 24, 1956

2,756,059
ADJUSTABLE WORK STOP FOR LATHE SPINDLES

Budd L. Knapp, Syracuse, N. Y.

Application December 14, 1953, Serial No. 398,047

2 Claims. (Cl. 279—2)

This invention has to do with a stop structure for use in lathe spindles, and is particularly useful in machining several pieces, all of which are to be of equal length.

The invention has as an object a stop structure of the type referred to embodying a particularly simple construction, economical to build, and which may be readily inserted into the lathe spindle and adjusted to provide for the desired length of the work piece.

The invention consists in the novel features and in the combinations and constructions hereinafter set forth and claimed.

In describing this invention, reference is had to the accompanying drawings in which like characters designate corresponding parts in all the views.

In the drawings:

Figure 1 is a longitudinal, sectional view of a lathe spindle and the stop structure embodying my invention.

Figure 2 is a fragmentary end elevational view looking to the right, Figure 1.

In the drawing, the lathe spindle is designated as 10 being journalled for rotation in bearings 12. The stop structure consists of a member 13 adapted to be positioned in the rear end portion of the spindle. The inner portion of the member 13 is formed with an internally threaded bore 14, and the outer portion of the member is formed with a conical bore 15. The outer end portion, formed with the conical bore 15, is provided with a plurality of circumferentially spaced apart axially extending slots 16 to provide expansible jaw portions 17. As shown in Figure 1, the expansible member 13 is positioned in a collet draw in tube 18 positioned in the lathe spindle and provided at its rear end with the conventional hand wheel 19 and threadedly engaging a work holding collet 20 at its forward end.

An expanding member 21 is positioned in the expansible member, the member 21 having a conical portion complemental to the conical bore 15 of the expansible member and having a threaded portion 22 threaded into the bore 14. The expansible member 13 is positioned in the rear end of the spindle or collet tube, with the end portion 24 of the expanding member positioned exteriorly of the spindle and preferably formed with flat wrench receiving surfaces forming the hexagonal shape shown in Figure 2.

The expanding member 24 is formed with a central axially extending passage in which a rod 26 is slidably mounted, this rod extending forwardly toward the nose end of the spindle and being preferably provided with a collar 27 to form a work engaging pad. The work piece is illustrated in dotted outline at 28, Figure 1. The pad 27 is positioned to give the desired length to the work piece 28, and the rod is clamped in adjusted position by a set screw 30. Preferably, the rod 26 has affixed to it a collar 31 of a diameter to be slidably received by the lathe spindle and which serves to maintain the rod central of the spindle in instances where the spindle is of appreciable length.

In use, the stop structure is inserted into the rear end of the spindle, the expanding member 21 tightened and the rod 26 shifted forwardly to the desired position and the set screw 30 tightened. Thereafter, all work pieces are inserted in the chuck or collet on the spindle with the rear ends of the work pieces engaging the forward end of the rod 26, or the pad 27, whereby, with fixed tooling, all work pieces are machined to the same length.

What I claim is:

1. An adjustable stop structure for lathe spindles comprising an expansible member adapted to be positioned in the bore of the spindle, an expanding member threaded into said expansible member and having a portion arranged exteriorly of the spindle, said expanding member being operable, when threaded into said expansible member, to expand the latter into fixed engagement with the spindle, said expanding member being formed with an axial extending bore, a rod slidably mounted in said bore and extending into the spindle, and means carried by said expanding member and operable externally of the spindle for clamping said rod in adjusted position.

2. An adjustable stop structure for lathe spindles and the like comprising an expansible member adapted to be positioned in the rear end of the spindle bore, an expanding member positioned in said expansible member and having a portion extending exteriorly of said expansible member and the rear end of the spindle, said expanding member being operable when threaded into said expansible member to expand the same into fixed engagement with the spindle, said expanding member being formed with a bore extending axially of the spindle, a stop rod slidably mounted in said bore and extending into the spindle, and said expanding member having a set screw in the extending portion thereof for clamping said rod thereto in adjusted position.

References Cited in the file of this patent

UNITED STATES PATENTS

| | | |
|---|---|---|
| 2,221,734 | Evans | Nov. 12, 1940 |
| 2,347,003 | Searle | Apr. 18, 1944 |
| 2,396,504 | Grey | Mar. 12, 1946 |
| 2,398,278 | Bailey | Apr. 9, 1946 |
| 2,423,551 | Caffin | July 8, 1947 |
| 2,674,026 | Palley | Apr. 6, 1954 |